A. H. LAWRENCE.
CYCLE, MOTOR CYCLE, AND ANALOGOUS SADDLE.
APPLICATION FILED JULY 19, 1921.
1,427,484.
Patented Aug. 29, 1922.
2 SHEETS—SHEET 2.
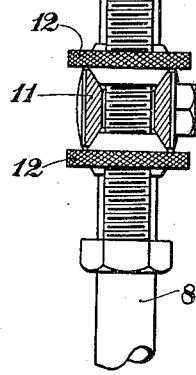
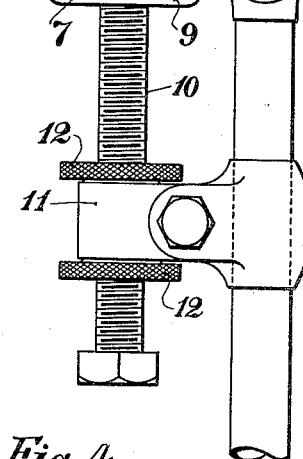
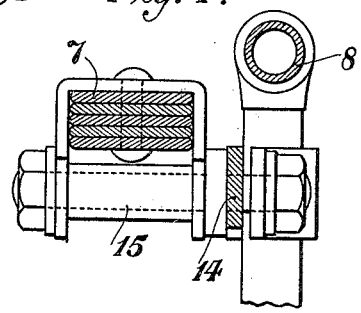
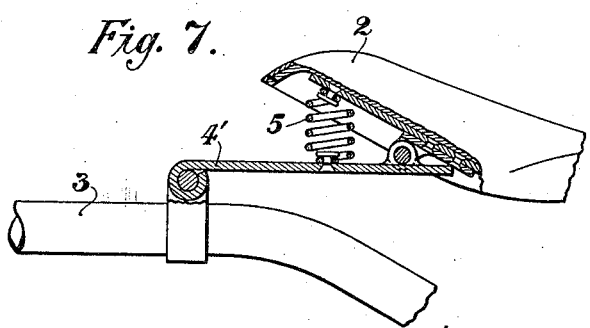

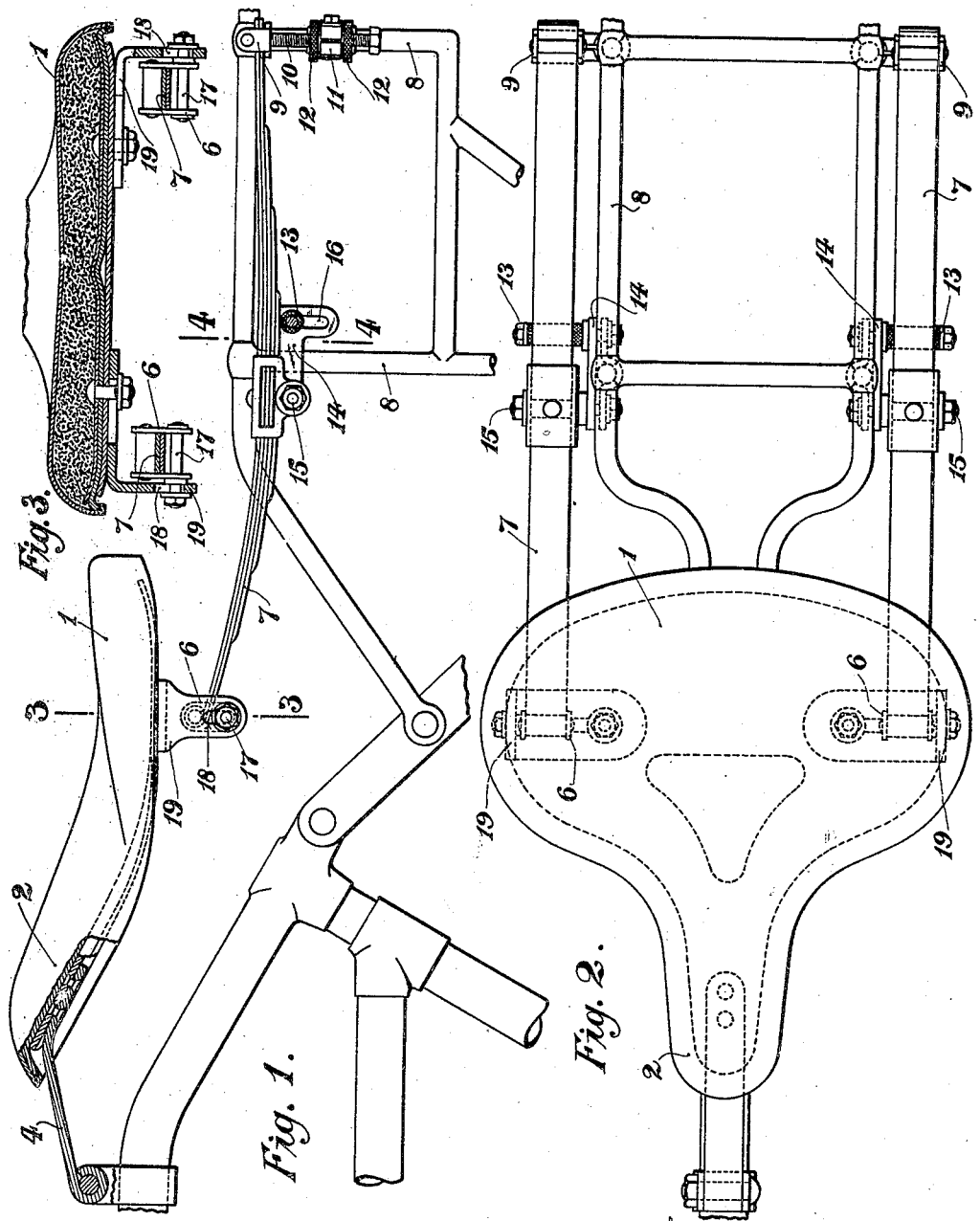

UNITED STATES PATENT OFFICE.

ARTHUR HILLSTEAD LAWRENCE, OF BIRMINGHAM, ENGLAND, ASSIGNOR TO J. B. BROOKS AND COMPANY LIMITED, OF BIRMINGHAM, ENGLAND.

CYCLE, MOTOR-CYCLE, AND ANALOGOUS SADDLE.

1,427,484. Specification of Letters Patent. Patented Aug. 29, 1922.

Application filed July 19, 1921. Serial No. 485,954.

*To all whom it may concern:*

Be it known that I, ARTHUR HILLSTEAD LAWRENCE, subject of the King of Great Britain, residing at Birmingham, England, have invented certain new and useful Improvements Relating to Cycle, Motor-Cycle, and Analogous Saddles, of which the following is a specification.

This invention relates to means for mounting saddles of cycles, motor-cycles and the like said means being of that type comprising a link connected between the nose of the saddle and the top tube of the machine, and leaf springs connected between the rear of the saddle and a convenient part at the rear of the machine frame.

The object of the present invention is to provide improved and more efficient suspension means of the above type.

According to the invention, the front of the saddle is connected to the top tube of the machine by means of a link pivoted to the said top tube, and the rear portion is supported at each side upon the forward end of a laminated leaf spring of the compensated cantilever type pivoted about its middle to the carrier and its rear end engaging an abutment also on the said carrier, this abutment being adjustable so that the strength of the spring can conveniently be regulated. Suitable stops are provided for limiting the upward movement of the saddle.

Figure 1 is a side elevation of the invention.

Figure 2 is a plan of same.

Figure 3 is a section on the line 3—3 Figure 1.

Figure 4 is a section on the line 4—4 Figure 1.

Figures 5 and 6 are an end elevation and part sectional side elevation respectively to an enlarged scale of the means for adjusting the tension upon the spring.

Figure 7 shows a modified form of mounting for the front of the saddle.

In carrying out the said invention, as shown upon the accompanying drawings, the saddle top 1 may be of any suitable construction and its forward end 2 is connected to the top tube 3 of the machine by means of a link 4 connected to the saddle means and hinged to the top tube at its forward end. When, as shown at Figure 7, a link 4' is employed hinged to the saddle top, a spring 5 may be employed between said link and the saddle top in order to give a resilient action to the forward part of the saddle. The rear of the saddle is supported, at each side, by means of a shackle 6 (whose lower pin 17 is adjustably mounted in a slot 18 in a bracket 19 depending from the saddle top) upon a forward end of a semielliptic leaf spring 7 pivoted at about its middle to the carrier 8, of the machine, with its rear end engaging beneath an abutment which is preferably adjustable. This stop may comprise an eye 9 through which the end of the spring extends and which is carried at the summit of a screw-threaded shank 10 passing through an eye 11 on a suitable part of the carrier and fitted with lock nuts 12 by the manipulation of which the shank can be raised or lowered, thus varying the strength of the spring. To limit the upward movement of the forward end of the spring a stop 13 may be carried by a bracket member 14 attached to the carrier rearwards of the pivot 15 of the spring and extending beneath the bottom leaf of the latter. This stop may be adjustably mounted in a slot 16 in the said bracket member.

Having fully described my invention what I desire to claim and secure by Letters Patent is:—

1. A motor-cycle, cycle and analogous saddle comprising a saddle top, a link connecting the front of the said top to the top-tube of the machine, a pair of compensated cantilever laminated leaf springs, means for connecting the forward ends of the springs to the rear of the saddle top, and stops upon a suitable part at the rear of the machine against which the rear ends of the springs abut.

2. A motor-cycle, cycle and analogous saddle comprising a saddle top, a link pivotally connected at its forward end to the top tube of the machine and at its rear end to the front of the saddle top, a spring interposed between the saddle top and the said link, a pair of compensated cantilever laminated leaf springs, means for connecting the forward ends of the springs to the rear of the saddle top, and stops upon a suitable part at the rear of the machine against which the rear ends of the springs abut.

3. A motor cycle, cycle and analogous saddle comprising a saddle top, a link connecting the front of the said top to the top tube of the machine, a pair of compensated cantilever laminated leaf springs, means for connecting the forward ends of the springs to the rear of the saddle top, stops upon a suitable part at the rear of the machine against which the rear ends of the springs abut, and means for adjusting the said stops to alter the tension upon the springs to suit the varying weights of different riders.

4. A motor-cycle, cycle and analogous saddle comprising a saddle top, a link connecting the front of the said top tube of the machine, a pair of compensated cantilever laminated leaf springs, means for connecting the forward ends of the springs to the rear of the saddle top, stops upon a suitable part at the rear of the machine against which the rear ends of the springs abut, and means for adjusting the stops the said means comprising an eye through which the end of the spring extends, a screw-threaded shank carrying the eye at its summit, an eye upon the carrier through which the shank passes, and lock-nuts upon the shank by means of which the latter can be raised or lowered.

5. A motor-cycle, cycle and analogous saddle comprising a saddle top, a link connecting the front of the said top to the top-tube of the machine, a pair of compensated cantilever laminated leaf springs, means for connecting the forward ends of the springs to the rear of the saddle top, stops upon a suitable part at the rear of the machine against which the rear ends of the springs abut, and abutments for limiting the upward movement of the saddle top when the load is released therefrom.

In testimony whereof I have hereunto set my hand.

ARTHUR HILLSTEAD LAWRENCE.